(12) United States Patent
Kim et al.

(10) Patent No.: US 6,740,614 B2
(45) Date of Patent: May 25, 2004

(54) DIELECTRIC CERAMIC COMPOSITION

(75) Inventors: Joon Hee Kim, Kyungki-do (KR); Kang Heon Hur, Kyungki-do (KR); Jong Han Kim, Kyungki-do (KR); Woo Sup Kim, Kyungki-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 85 days.

(21) Appl. No.: 10/123,224

(22) Filed: Apr. 17, 2002

(65) Prior Publication Data

US 2003/0100429 A1 May 29, 2003

(30) Foreign Application Priority Data

Nov. 13, 2001 (KR) ................................ 2001-70539

(51) Int. Cl.$^7$ ............................................. C04B 35/468
(52) U.S. Cl. .................................................... 501/139
(58) Field of Search ............................... 501/137, 138, 501/139

(56) References Cited

U.S. PATENT DOCUMENTS

| | | | | | |
|---|---|---|---|---|---|
| 5,493,262 | A | * | 2/1996 | Abe et al. ................. | 333/219 |
| 6,107,228 | A | * | 8/2000 | Sugimoto et al. .......... | 501/139 |
| 6,184,165 | B1 | * | 2/2001 | Kawata ...................... | 501/32 |
| 6,340,649 | B1 | * | 1/2002 | Kawata et al. ............. | 501/138 |
| 6,387,835 | B2 | * | 5/2002 | Kim et al. .................. | 501/136 |
| 6,429,164 | B1 | * | 8/2002 | Wada et al. ................ | 501/139 |

FOREIGN PATENT DOCUMENTS

JP          200086337          * 3/2000

\* cited by examiner

Primary Examiner—Karl Group
(74) Attorney, Agent, or Firm—Lowe Hauptman; Gilman & Berner LLP

(57) ABSTRACT

A dielectric ceramic composition of high dielectric constant and low dielectric loss, which can be co-fired with Ag electrodes, is provided for use in various parts of electric and electronic appliances. The composition is represented by the following chemical formula:

a wt. % {x BaO—$y_1 Nd_2O_3$—$y_2 Sm_2O_3$—w $Bi_2O_3$—z $TiO_2$}+ b wt. % (ZnO—$B_2O_3$—$SiO_2$—PbO based glass frit)+ c wt. % CuO wherein, 10.0 mol % $\leq x \leq$ 20.0 mol %; 7.0 mol % $\leq y_1 + y_2 \leq$ 20.0 mol %; 0.5 mol % $\leq w \leq$ 5.0 mol %; 60.0 mol % $\leq z \leq$ 80.0 mol %, with the proviso that $x + y_1 + y_2 + w + z =$ 100; 80.0 wt. % $\leq a \leq$ 98.0 wt. %; 1.0 wt. % $\leq b \leq$ 10.0 wt. %; 1.0 wt. % $\leq c \leq$ 10.0 wt. %.

3 Claims, No Drawings

DIELECTRIC CERAMIC COMPOSITION

BACKGROUND OF THE INVENTION

1. Field of the Invention

The present invention relates to a dielectric ceramic composition widely used in high frequency electronic components and, more particularly, to a low-temperature cofired dielectric ceramic composition with a high dielectric constant and a low dielectric loss.

Low-temperature cofired dielectric compositions (materials) means compositions (materials) which can be fired in the temperature range of 800–950° C., lower than the melting point of silver (Ag) or copper (Cu), in contrast to the conventional ceramic dielectrics which are sintered at 1,300° C. or higher.

2. Description of the Prior Art

In view of the recent trend for miniaturization, lightness and modulization of high frequency electronic devices, it is required to develop dielectric material which can be multi-layered, followed by cofired with the inner electrode.

For multilayering and cofiring with the conventional dielectric materials, it is required to use high melting temperature metals, such as Mo or W, as inner electrode patterns.

Where Mo or W is adopted to form inner electrode patterns, however, an economic disadvantage is incurred because of its high cost. Above all, the skin effect, which causes radio frequency current to concentrate on the surface of a conductor, requires the use of metals with low resistance to reduce the electric loss. Accordingly, the use of metals that are relatively inexpensive, as well as being of high electric conductivity, like Ag or Cu is indispensable.

Therefore, it is very important research project to find a dielectric material which can be sintered at lower temperature than the melting point of Ag (960° C.) or Cu (1083° C.).

Generally, low-temperature cofired dielectrics can be made by mixing high-temperature sintered material with a small amount of a low melting point material, for example, glass powder or an additive such as CuO, PbO and $Bi_2O_3$, $V_2O_5$, etc., or by firing glass ceramics comprising ceramics as a filler.

In the case of the latter, the resulting dielectric substrates based on glass show a dielectric constant of 10 or less.

With advantages of low dielectric constants in speeding-up of signal processing and improvement of signal transmission, materials with a low dielectric constant of 10 or less are extensively used for low temperature cofired ceramics (LTCC).

In some cases, meanwhile, substrates made of dielectrics with low dielectric loss and medium dielectric constant (15–100) may be advantageous in terms of circuit design and function without retardation of signal processing, depending on characteristics of applied it circuits.

In addition, the use of dielectrics with high dielectric constants makes the guided wavelength short, leading to a reduction in circuit dimension. Thus, such dielectrics are very useful in applications which give importance to dimensions of electronic devices, as well as having the advantage of reducing insertion loss or frequency deviation in some circuits.

Larger dielectric constants can lower the ratio between the width of transmission lines and the thickness of dielectrics to greater extents, giving circuit designers an opportunity to design better lamination structures.

$BaO-Re_2O-TiO_2$ (Re=rare earth element) dielectric composition with a dielectric constant of 70 or higher can be made low in sintering temperature by the addition of $B_2O_3-SiO_2$ based glass frit as disclosed in Korean Pat. Laid-Open Publication (No.1999-62997). However, this dielectric composition can be fired at temperatures of 1,000° C. or higher which are too high to co-fire Ag electrodes.

SUMMARY OF THE INVENTION

Leading to the present invention, the intensive and thorough research into LTCC, conducted by the present inventors, resulted in the finding that in cooperation with glass frit, CuO can serve as a sintering aid to increase the dielectric constant, and play a role in controlling the temperature coefficient of frequency without a large change in Q value.

Therefore, it is an object of the present invention to overcome the above problems encountered in prior arts and provide a dielectric ceramic composition which exhibits high dielectric constant and low dielectric loss and can be sintered at low temperature.

In accordance with an aspect of the present invention, there is provided a dielectric ceramic composition represented by the following chemical formula 1:

Chemical Formula 1 a wt. % {x $BaO-y_1Nd_2O_3-y_2Sm_2O_3$-w $Bi_2O_3$-z $TiO_2$}+ b wt. % ($ZnO-B_2O_3-SiO_2-PbO$ based glass frit)+ c wt. % CuO wherein, 10.0 mol %$\leq x \leq$20.0 mol %; 7.0 mol %$\leq y_1+y_2 \leq$20.0 mol %; 0.5 mol %$\leq w \leq$5.0 mol %; 60.0 mol %$\leq z \leq$80.0 mol %, with the proviso that $x+y_1+y_2+w+z=100$; 80.0 wt. %$\leq a \leq$98.0 wt. %; 1.0 wt. %$\leq b \leq$10.0 wt. %; 1.0 wt. %$\leq c \leq$10.0 wt. %.

DETAILED DESCRIPTION OF THE INVENTION

Based on $BaO-Nd_2O_3-Sm_2O_3-Bi_2O_3-TiO_2$, the dielectric ceramic composition of the present invention comprises $ZnO-B_2O_3-SiO_2-PbO$ glass frit and CuO. The composition composed of $BaO-Nd_2O_3-Sm_2O_3-Bi_2O_3-TiO_2$ alone exhibits a sintering temperature of 1,350° C. or higher, which is too high to co-fire silver (Ag) electrodes, which melt at 961° C. In the present invention, glass frit and CuO are adopted to induce the liquid-phase sintering of the base composition, whereby Ag electrodes can be co-fired.

The driving force for the densification of the liquid-phase sintering that enables the low-temperature sintering of materials with high sintering temperature, is driven by the liquid phase's capillary pressure which is exerted among fine particles of a solid phase. For liquid-phase sintering, the following requirements are required.

First, the base dielectric composition is required to include enough amount of a liquid phase to completely cover primary particles thereof, and have some solubility. Additionally, good wettability of the base dielectric composition in the liquid phase is required. Above all, liquid-phase sintering requires the formation of a liquid phase. In this regard, the additives must react with the base dielectric composition to form a liquid phase. Further, the glass frit must have a suitable softening temperature (Ts). Another requirement is that the liquid phase formed has low viscosity as to flow over all particles, thereby uniformly wetting the base composition.

In addition, smaller primary particles incur larger capillary pressures and thus, show larger driving forces for the compaction. Also, the distribution of the liquid phase among the primary particles is an important factor affecting the densification.

Accordingly, the base dielectric composition is mixed with the glass frit and CuO and the mixture is thermally treated at a temperature somewhat higher than the Ts of the glass frit to form a liquid phase which is uniformly distributed over the base dielectric composition, followed by sintering, in accordance with the present invention. As a result, excellent densification can be obtained in the dielectric composition of the present invention. Therefore, it is important to define the molar ratio among the constituent compounds of the base dielectric composition, as well as the composition and amounts of the additives capable of forming a liquid phase by reaction with the base composition, that is, the amount of CuO and the composition and amount of the glass frit.

Useful in a base composition in the present invention is the composition comprising BaO in an amount of 10.0–20.0 mol %, $Nd_2O_3$ and $Sm_2O_3$ in an amount of 7.0–20.0 mol %, $Bi_2O_3$ in an amount of 0.5–5.0 mol %, and $TiO_2$ in an amount of 60.0–80.0 mol % with the proviso that the total mol % of individual components is 100.

With the content of any component being out of the range therefor, the base dielectric composition exhibits too low a dielectric constant or too high a temperature coefficient of resonant frequency to use in practice. In detail, when BaO is used in an amount less than 10.0 mol %, $TiO_2$ becomes more abundant or $Nd_2O_3$—$TiO_2$ compounds, which are low in dielectric constant, are formed to increase the temperature coefficient of resonant frequency or to reduce the dielectric constant. On the other hand, at over 20 mol % of BaO, BaO—$TiO_2$ compounds low in dielectric constant are formed to drive down the dielectric constant of the base composition. Thus, the content of BaO is preferably in the range of 10 to 20 mol %.

Also, in connection with the amount of BaO, amounts of $Nd_2O_3$ ($Sm_2O_3$) and $TiO_2$ must fall within their respective above-determined ranges to provide high dielectric constant and stable TCF for the composition.

When $Nd_2O_3$ and $Sm_2O_3$ amount to more than 20 mol % in sum, an $Nd_2O_3$ ($Sm_2O_3$)—$TiO_2$ phase low in dielectric constant becomes abundant, leading to a reduction in dielectric constant and Q value.

Serving to keep the dielectric constant high and to control TCF, especially to stabilize the phase, $Bi_2O_3$ is indispensable for the composition. Its amount is limited within 5.0 mol %: otherwise, the composition cannot be used as a dielectric material owing to its drastic decrease in Q value.

Useful in the present invention is a ZnO—$B_2O_3$—$SiO_2$—PbO based glass frit. Its amount is preferably on the order of 1.0–10.0 wt %. Preferably, it comprises ZnO in an amount of 30–70 wt %, $B_2O_3$ in an amount of 5–30 wt %, $SiO_2$ in an amount of 5–40 wt %, and PbO in an amount of 2–40 wt %.

$B_2O_3$ lowers the viscosity of the glass and accelerates the sintering of the dielectric ceramic composition of the present invention. Where $B_2O_3$ is used in an amount lower than 5 wt. %, the dielectric ceramic composition is likely to not be sintered at lower than 900° C. With more than 30 wt % of $B_2O_3$, the dielectric ceramic composition has poor moisture resistance. Thus, its amount is preferably in the range of 5–30 wt. % in the glass frit.

More than 40 wt % of $SiO_2$ results in an excessive increase in the softening temperature of the glass frit which therefore cannot act as a sintering aid. When $SiO_2$ is present in an amount less than 5 wt %, its effect is not obtained. That is, a preferable amount of $SiO_2$ falls within the range of 5–40 wt. %.

With less than 2 wt % of PbO, the glass frit has too high a softening temperature (Ts), making no contribution to the sintering of the dielectric ceramic composition. On the other hand, more than 40 wt. % of PbO lowers the Ts of the glass frit to improve the sintering of the composition, but has the problem of decreasing Q value. Considering these facts, the amount of PbO in the glass frit is defined in the range of 2–40 wt %.

It is preferred that ZnO is used in an amount of 30–70 wt %. Excessive amounts of ZnO lead to an increase in the softening temperature of the glass frit, making the low temperature firing impossible.

In accordance with the present invention, CuO is used in the dielectric ceramic composition of the present invention. For improving the sinterability and controlling dielectric properties, CuO is preferably added in an amount of 1.0–10.0 wt %. CuO plays a main role in liquid-phase sintering while the glass frit aids the completion of the sintering.

Supplemented with the above-defined amounts of the glass frit and CuO, the dielectric ceramic composition of the present invention can be sintered at less than 900° C. and shows a dielectric constant of 50 or higher, a high Q value, and a TCF of ±20 ppm/° C. or less.

Below, a description will be given of the preparation of the dielectric ceramic composition of the present invention.

The starting materials BaO, $Nd_2O_3$, $Sm_2O_3$, $Bi_2O_3$, and $TiO_2$, each with a purity of 99.0% or higher, are weighed according to a desired composition of x BaO-$y_1$ $Nd_2O_3$-$y_2$ $Sm_2O_3$-w $Bi_2O_3$-z $TiO_2$, and admixed in a wet manner. In this regard, the wet mixing is carried out by milling the starting materials in deionized water for about 16 hours with the aid of 3Φ zirconia balls in a rod mill. The slurry thus obtained is dried and calcined. Preferably, the calcination is carried out at 1,100–1,150° C. for about 2–3 hours at the heating rate of 5° C./min. When the calcination temperature is too low, intermediate phases rather than complete phases are formed, giving rise to an increase in shrinkage. When the calcination is carried out at too high temperatures, on the other hand, the particles become too coarse to pulverize later.

After being weighed according to a desired composition, the glass frit components are melted at 1,200–1,400° C., quenched in water, and dry-pulverized. Then, the coarse particles are finely pulverized into powder with a size of 0.5~1.0 μm in ethyl alcohol because too large particle sizes results in a nonhomogenous mixture.

The base dielectric ceramic composition is admixed with the glass frit powder composition, together with appropriate amounts of CuO, in a batch. This admixing is preferably carried out for 16 hours.

Following drying, the powder thus obtained was thermally treated at 600–700° C. preferably for 2–3 hours. The thermal treatment temperature is somewhat higher than the softening temperature (Ts) of the glass frit, so that a liquid phase of the glass frit is formed and coated uniformly over the base composition particles, thereby improving the reactivity and uniformity. By these reasons the sinterability of the dielectric ceramic composition can be improved.

Next, the thermally treated powder is further broken down into a desired particle size, and molded to a desired form such as a disc or a sheet.

Afterwards, electrodes are formed in the molded disc or sheet and co-fired at less than 900° C. to produce a desired device.

Having generally described this invention, an improved understanding can be obtained by reference to certain specific examples which are provided herein for purposes of illustration only and are not intended to be limiting unless otherwise specified.

EXAMPLE 1

As a starting material for the base dielectric ceramics, BaO, $Nd_2O_3$, $Sm_2O_3$, $Bi_2O_3$, and $TiO_2$, each with a purity of 99.0% or higher, were weighed according to the composition of x BaO-$y_1$ $Nd_2O_3$-$y_2$ $Sm_2O_3$-w $Bi_2O_3$-z $TiO_2$ as given in Table 1, below, and admixed in deionized water for 16 hours with 3Φ zirconia balls using a rod mill.

The slurry thus obtained was dried, roughly pulverized in a mortar, and heated at the rate of 5° C./min to a temperature of 1,150° C. at which calcination was carried out for 2 hours.

Next, the calcined powder was first pulverized in a mortar and then milled for 80 min by use of a planetary mill at 200 rpm. After being combined with a binder, the pulverized powder was molded into a disc by uniaxial compression at a pressure of 2.0 ton/cm² using a 14 mmΦ mold. The specimen was sintered at 1,350° C. for 3 hours and measured for dielectric constant (K), Q value, TCF and sintered density. The results are given in Table 1.

In Table 1, the dielectric constant (K) and Q value were measured by the Hakki & Coleman method, and the measurment of temperature coefficient of resonant frequency (TCF) was carried by the cavity method. TCF was determined between 20 and 85° C. In this regard, the specimen was measured for resonant frequency after being maintained at 20° C., and then heated to and maintained at 85° C. for 30 min prior to re-measurement for resonant frequency. With the measurements, the TCF was determined.

TABLE 1

| Base Composition No. | Composition (mol %) | | | | K | Q (at 1 GHz) | TCF (ppm/° C.) | Sintering Temp. (° C.) |
|---|---|---|---|---|---|---|---|---|
| | x | $y_1$ | $Y_2$ | w | z | | | |
| 1 | 23.0 | 16.0 | 2.0 | 1.0 | 58.0 | 51.0 | 6,000 | 8.0 | 1350 |
| 2 | 9.0 | 8.0 | 1.0 | 1.0 | 81.0 | 95.0 | 8,200 | 98.0 | 1350 |
| 3 | 9.0 | 17.5 | 2.0 | 1.5 | 71.0 | 58.5 | 2,000 | 30.0 | 1350 |
| 4 | 15.0 | 14.3 | 9.0 | 1.5 | 60.2 | 52.4 | 4,200 | 7.0 | 1350 |
| 5 | 14.0 | 9.0 | 6.5 | 6.0 | 64.5 | 88.0 | 1,200 | 15.0 | 1350 |
| 6 | 17.0 | 10.0 | 6.0 | 0.5 | 66.5 | 86.0 | 9,500 | 16.0 | 1350 |
| 7 | 11.5 | 9.0 | 7.0 | 3.0 | 69.5 | 89.0 | 9,000 | 15.0 | 1350 |
| 8 | 10.0 | 11.0 | 2.0 | 1.5 | 75.5 | 93.0 | 7,000 | 12.5 | 1350 |
| 9 | 12.0 | 15.0 | 1.0 | 0.5 | 71.5 | 86.5 | 5,500 | 17.0 | 1350 |
| 10 | 15.0 | 9.5 | 6.0 | 1.9 | 67.6 | 93.0 | 7,000 | 16.0 | 1350 |

As shown in Table 1, the base ceramic composition according to the present invention (Nos. 6–10) have dielectric constants higher than 60, in addition to exhibiting high Q values and appropriate TCF.

Most of the glass frits suitable for use in the low-temperature sintering according to the present invention have dielectric constants of as low as 10 and thus, cause a reduction in dielectric constant and Q value when combined with the base dielectric composition. Also, it is expected that, when sintering is carried out at as low as 900° C., the dielectric constant is decreased since the calcined phase of the base composition cannot become a high temperature sintered phase. To ensure that the final dielectric ceramic composition will have a dielectric constant of 50 or higher, therefore, the base composition must be higher than 60 in dielectric constant. Besides, the base composition must have a TCF of 0 ppm/° C. or higher because its TCF tends to move toward the negative direction when it is combined with the glass frit and CuO.

Accordingly, it is apparent from the data of Table 1 that composition Nos. 6–10 are suitable for developing low-temperature co-fired dielectrics with a dielectric constant of 50 or higher.

EXAMPLE 2

After composition Nos. 7 and 8 of Table 1 were roughly pulverized in respective mortars, the glass frit was added in an amount of 4.0–12.0 wt % to 30 g of each composition, followed by the addition of CuO in an amount of 0–12.0 wt %, as shown in Table 3, below.

The glass frit was prepared by weighing its components according to the compositions of Table 2, melting them at 1,200–1,400° C., quenching in water, dry-pulverizing it to coarse particles, and milling them to a size of 0.5–1.0 μm in ethyl alcohol.

Next, the admixture was dried, and calcined at 600–700° C. for 2 hours.

Subsequently, the calcined powder was pulverized first in a mortar and then milled for 30 min by use of a planetary mill at 200 rpm.

After being combined with a binder, the pulverized powder was molded into a disc by uniaxial compression at a pressure of 2.0 ton/cm2 using a 14 mmΦ mold. The specimen was sintered at 900 or 1,150° C. for 3 hours and measured the dielectric constant (K), Q value, TCF and sintered density. The results are given in Table 3, below.

In Table 3, comparative composition 3 was prepared by sintering comparative composition 2 at 1,050° C. Also, the samples were analyzed for sintered state and the results are summarized in Table 3.

Dielectric properties, including dielectric constant (K), Q value, and TCF, were measured in the same manner as in Example 1.

TABLE 2

| Glass Frit No. | $B_2O_3$ | $SiO_2$ | ZnO | PbO |
|---|---|---|---|---|
| Example G 1 | 25 | 12 | 60 | 3 |
| Example G 2 | 17 | 10 | 57 | 15 |
| Comparative G 3 | 3 | 27 | 60 | 10 |
| Comparative G 4 | 35 | 20 | 40 | 5 |
| Comparative G 5 | 20 | 3 | 55 | 22 |
| Comparative G 6 | 15 | 45 | 35 | 5 |
| Comparative G 7 | 20 | 30 | 49 | 1 |
| Comparative G 8 | 10 | 15 | 32 | 43 |
| Comparative G 9 | 12 | 10 | 75 | 3 |

TABLE 3

| Dielectric No. | Base Composition Kind | Amount (wt %) | Glass Frit Kind | Amount (wt %) | CuO (wt %) | Dielec. Const. (k) | Q (at 1 GHz) | TCF ppm/° C. | Sinter. Temp. (° C.) | Note |
|---|---|---|---|---|---|---|---|---|---|---|
| Comparative 1 | 7 | 96.0 | G1 | 4.0 | 0 | — | — | — | 900 | [2]N. S. |
| Comparative 2 | 7 | 92.0 | G1 | 8.0 | 0 | — | — | — | 900 | [2]N. S. |
| Comparative 3 | 7 | 92.0 | G1 | 8.0 | 0 | 80.2 | 6500 | 9.0 | 1150 | Sintered |
| Comparative 4 | 7 | 97.0 | — | — | 3.0 | — | — | — | 900 | [1]P. S. |
| Comparative 5 | 7 | 93.0 | — | — | 7.0 | — | — | — | 900 | [1]P. S. |
| Example 1 | 7 | 95.0 | G1 | 4.0 | 1.0 | 55.0 | 2800 | 6.0 | 900 | Sintered |
| Example 2 | 7 | 93.0 | G1 | 4.0 | 3.0 | 60.0 | 3500 | 3.2 | 900 | Sintered |
| Example 3 | 7 | 91.0 | G1 | 4.0 | 5.0 | 65.0 | 4000 | −3.6 | 900 | Sintered |
| Example 4 | 7 | 89.0 | G1 | 4.0 | 7.0 | 70.5 | 3800 | −4.0 | 900 | Sintered |
| Comparative 6 | 7 | 86.0 | G1 | 4.0 | 12.0 | 49.2 | 500 | −12.0 | 900 | Sintered |
| Example 5 | 7 | 89.0 | G1 | 6.0 | 5.0 | 62.0 | 3500 | −4.5 | 900 | Sintered |
| Example 6 | 7 | 87.0 | G1 | 8.0 | 5.0 | 59.0 | 3000 | −5.0 | 900 | Sintered |
| Comparative 7 | 7 | 83.0 | G1 | 12.0 | 5.0 | 47.9 | 700 | −7.0 | 900 | Sintered |
| Comparative 8 | 7 | 96.0 | G2 | 4.0 | 0 | — | — | — | 900 | [2]N. S. |
| Comparative 9 | 7 | 92.0 | G2 | 8.0 | 0 | — | — | — | 900 | [2]N. S. |
| Example 7 | 7 | 95.0 | G2 | 4.0 | 1.0 | 55.3 | 2600 | −3.0 | 900 | Sintered |
| Example 8 | 7 | 93.0 | G2 | 4.0 | 3.0 | 61.2 | 3300 | −3.2 | 900 | Sintered |
| Example 9 | 7 | 91.0 | G2 | 4.0 | 5.0 | 62.7 | 3900 | −3.6 | 900 | Sintered |
| Example 10 | 7 | 89.0 | G2 | 4.0 | 7.0 | 61.5 | 3700 | −4.0 | 900 | Sintered |
| Comparative 10 | 7 | 84.0 | G2 | 4.0 | 12.0 | 48.5 | 800 | −14.2 | 900 | Sintered |
| Comparative 11 | 7 | 89.0 | G2 | 6.0 | 5.0 | 56.6 | 3200 | −4.6 | 900 | Sintered |
| Comparative 12 | 7 | 87.0 | G2 | 8.0 | 5.0 | 53.5 | 1900 | −5.2 | 900 | Sintered |
| Comparative 11 | 7 | 84.0 | G2 | 11.0 | 5.0 | 45.0 | 700 | −7.3 | 900 | Sintered |
| Example 13 | 8 | 91.0 | G1 | 4.0 | 5.0 | 66.5 | 3400 | −4.6 | — | Sintered |
| Example 14 | 8 | 87.0 | G2 | 8.0 | 5.0 | 54.5 | 2400 | −5.6 | 900 | Sintered |
| Example 15 | 8 | 91.0 | G2 | 4.0 | 5.0 | 63.7 | 3400 | −3.2 | 900 | Sintered |
| Comparative 12 | 7 | 92.0 | C. G3 | 6.0 | 2.0 | — | — | — | 900 | [1]P. S. |
| Comparative 13 | 7 | 92.0 | C. G4 | 6.0 | 2.0 | 60.1 | 2100 | 5.0 | 900 | [3]P.M.S. |
| Comparative 14 | 7 | 97.0 | C. G5 | 6.0 | 2.0 | — | — | — | 900 | [1]P. S. |
| Comparative 15 | 7 | 92.0 | C. G6 | 6.0 | 2.0 | — | — | — | 900 | [1]P. S. |
| Comparative 16 | 7 | 92.0 | C. G7 | 6.0 | 2.0 | — | — | — | 900 | [1]P. S. |
| Comparative 17 | 7 | 92.0 | C. G8 | 6.0 | 2.0 | 65.0 | 800 | 6.2 | 900 | Poor Q |
| Comparative 18 | 7 | 92.0 | C. G9 | 6.0 | 2.0 | — | — | — | 900 | [1]P. S. |

[1]poorly sintered
[2]not sintered
[3]poor moisture resistance

In addition to being sintered at as low as 900° C., the dielectric ceramic compositions 1–15 of the present invention, as shown in Table 3, have a dielectric constant of 53.5 or higher, a Q value of 1,900 or higher, and a TCF of ±6.0 ppm/° C.

In contrast, the comparative compositions 1–14 are poorly sintered at 900° C. or, even if sintered, show poor properties.

When adding only the glass frit in the absence of CuO, the composition was not sintered at all, irrespective of the composition of the glass frit. On the other hand, when CuO was added, but not the glass frit, only insufficient sintering effects were obtained. Therefore, it can be seen that complete sintering is guaranteed in the co-presence of the glass frit and CuO.

By way of example, the dielectric ceramic composition comprising 4 wt % of the glass frit, exclusive of CuO, was not sintered. However, when adding only 1 wt % of CuO in addition to 4 wt % of the glass frit, the sintering of the composition was improved sufficiently to exhibit a dielectric constant of 50 or higher.

Additionally, as seen in Table 3, increasing the CuO content brings about an improvement in the sintering of the dielectric ceramic composition, thereby providing stable dielectric properties in spite of low sintering temperatures. However, the amount of CuO is preferably on the order of up to 10.0 wt %. More than 10.0 wt % of CuO causes a decrease in Q value, leading to a decrease in specific resistance.

Also, the data of Table 3 shows that the dielectric properties of the composition are not largely dependent on the compositions (G1 and G2) of the glass frit if they are within the range set according to the present invention.

As described above, the addition of glass frit and CuO to the base composition which is sinterable at 1,300° C. or higher makes it possible for the dielectric ceramic composition of the present invention to be cofired with Ag electrode at as low as 900° C. Thus the dielectric ceramic compositions of the present invention exhibit a dielectric constant of 50 or higher, a Q value of 1,000 or higher (at 1 GHz), and a TCF of ±20.0 ppm/° C., so that they are suitable for use in multilayered LC filter.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A dielectric ceramic composition, represented by the following chemical formula 1:

Chemical Formula 1 a wt. % {x BaO—$y_1$Nd$_2$O$_3$—$y_2$Sm$_2$O$_3$—w Bi$_2$O$_3$—z TiO$_2$}+ b wt. % (ZnO—B$_2$O$_3$—SiO$_2$—PbO based glass frit)+ c wt. % CuO wherein, 10.0 mol % $\leq$ x $\leq$ 20.0 mil %; 7.0 mol % $\leq$ $y_1$+$y_2$ $\leq$ 20.0 mol %; $y_2$ $\geq$ 1 mol%; 0.5 mol % $\leq$ w $\leq$ 5.0 mol %; 60.0 mol % $\leq$ z $\leq$ 80.0 mol %, with the proviso that x+$y_1$+$y_2$+w+z=100; 80.0 wt. % $\leq$ a $\leq$ 98.0 wt. %; 1.0 wt. % $\leq$ b $\leq$ 10.0 wt. %; 1.0 wt. % $\leq$ c $\leq$ 10.0 wt. %.

2. The dielectric ceramic composition according to claim 1, wherein the glass frit comprises ZnO in an amount of 30–70 wt %, B$_2$O$_3$ in an amount of 5–30 wt %, SiO$_2$ in an amount of 5–40 wt % and PbO in an amount of 2–40 wt %.

3. The dielectric ceramic composition according to claim 1, wherein $y_1$>0 mol%, and c>2.0 wt.%.

* * * * *